United States Patent
Toole et al.

[11] Patent Number: 5,590,623
[45] Date of Patent: Jan. 7, 1997

[54] CAT LITTER BOX

[76] Inventors: Robert D. Toole; Anne-Melissa Rose, both of P.O. Box 24111, Ontario, Canada, K2M 2C3

[21] Appl. No.: 420,874
[22] Filed: Apr. 13, 1995
[51] Int. Cl.⁶ .................................................. A01K 1/035
[52] U.S. Cl. ................................................. 119/165
[58] Field of Search ................................. 119/165, 166, 119/167, 168, 169, 170

[56] References Cited

U.S. PATENT DOCUMENTS

| | | |
|---|---|---|
| 2,306,014 | 12/1942 | Carson . |
| 3,085,550 | 4/1963 | Crawford . |
| 3,310,031 | 3/1967 | Lowe, Jr. . |
| 3,771,493 | 11/1973 | Chandor . |
| 3,793,989 | 2/1974 | Clark . |
| 3,831,557 | 8/1974 | Elesh ........................ 119/170 |
| 3,885,523 | 5/1975 | Coleman .................. 119/165 |
| 3,990,397 | 11/1976 | Lowe, Jr. . |
| 4,164,314 | 8/1979 | Edgar ........................ 119/165 |
| 4,271,544 | 6/1981 | Hammond . |
| 4,279,217 | 7/1981 | Behringer . |
| 4,541,360 | 9/1985 | Higgins et al. . |
| 4,548,160 | 10/1985 | Feitelson . |
| 4,553,671 | 11/1985 | Cheesman . |
| 4,624,380 | 11/1986 | Wernette ................... 119/168 |
| 4,627,382 | 12/1986 | Muzzey . |
| 4,640,225 | 2/1987 | Yananton . |
| 4,646,684 | 3/1987 | Embry . |
| 4,696,257 | 9/1987 | Neary et al. . |
| 4,766,845 | 8/1988 | Bavas ........................ 119/165 |
| 4,771,731 | 9/1988 | Derx et al. . |
| 4,813,376 | 3/1989 | Kaufman et al. . |
| 4,838,202 | 6/1989 | Neu . |
| 4,848,274 | 7/1989 | Yananton . |
| 4,852,518 | 8/1989 | Yananton . |
| 4,858,561 | 8/1989 | Springer . |
| 4,926,794 | 5/1990 | Yamamoto . |
| 4,972,800 | 11/1990 | Bennett et al. . |
| 4,998,504 | 3/1991 | Ball ........................... 119/168 |
| 5,027,748 | 7/1991 | Wolak ....................... 119/168 |
| 5,092,277 | 3/1992 | Baillie et al. ............. 119/165 |
| 5,167,204 | 12/1992 | Nussle . |
| 5,195,464 | 3/1993 | Mutter . |
| 5,211,133 | 5/1993 | Foley . |
| 5,218,930 | 6/1993 | Casmira . |
| 5,220,885 | 6/1993 | Goetz . |
| 5,272,999 | 12/1993 | Nussle . |
| 5,329,878 | 7/1994 | McCauley . |
| 5,477,812 | 12/1995 | Waters ...................... 119/166 |

FOREIGN PATENT DOCUMENTS 2613659 10/1977 Germany .................. 119/170

*Primary Examiner*—Todd E. Manahan
*Attorney, Agent, or Firm*—Cushman Darby & Cushman IP Group of Pillsbury Madison & Sutro LLP

[57] ABSTRACT

A cat litter box has a solid bottom, vertical sides and a top with an opening to admit a cat. The height of the vertical sides is such that a cat can reach the top with its forepaws by standing on its hindlegs. The box is low enough that a cat would have easy access to the box, yet is deep enough to prevent the escape of litter or excreta from the box during use by a cat.

14 Claims, 5 Drawing Sheets

CAT LITTER BOX

FIELD OF THE INVENTION

The present invention relates to an improved cat litter box. Many patents have been issued for a wide range of containers for cat litter. Almost without exception, these litter boxes have had structures that facilitated entry by the cat, requiring the cat to exert a minimum of effort to enter and use the box. As a result, these litter boxes have not been able to retain the litter in the box when the cat seeks to bury its excreta. As all cat owners know, it is an instinctive reaction for cats to scratch the litter after relieving themselves. Frequently the litter is thrown out of the box by vigorous scratching. Moreover, male cats are particularly prone to spray their urine out of conventional litter boxes.

What is required for a clean and efficient litter box is one that cats cannot throw the litter from and from which no urine or faeces escapes. Preferably such a litter box should also prevent litter from being tracked out of the box on the cat's feet.

DISCUSSION OF THE PRIOR ART

As mentioned above, there are many patents extant for cat litter boxes. Searches of the prior art have produced dozens of such patents. In the United States Patent Office Classification System, Class 119 and its various subclasses seem to be entirely devoted to cat litter boxes. These patent documents extend over a period of many years with many attempts made to come up with the ideal litter box. Such efforts range from Lowe, Jr. U.S. Pat. No. 3,310,031 of Mar. 21, 1967, to McCauley U.S. Pat. No. 5,329,878 of Jul. 19, 1994. Lowe Jr. recognized that the box should be rectangular, and that the walls at the ends of the box should project upwardly from the side walls "to a substantial height thereabove", (column 2, lines 58 and 59).

Unfortunately, cats do not conform to the wishes of designers of litter boxes. A box with low sides and high ends, and no shelf as defined above, will not retain litter or urine. Litter will be sent flying by vigorous scratching, and male cats will urinate over the low sides.

Similarly, McCauley U.S. Pat. No. 5,329,878 provides a box for a pot belly pig, a creature not known for its ability to jump. Thus an inclined ramp is provided in one end of the box. Here again this design would not meet the criteria for a cat litter box. Litter and urine would not be retained in such a box if used by a cat.

Other United States Parents which have been studied in order to assess the patentability of the present invention include the following:

| U.S. Pat. No. | Date | Inventor | Title |
|---|---|---|---|
| 3,085,550 | 04/16/63 | Crawford | Cat Sanitary Container Enclosure |
| 3,771,493 | 11/13/73 | Chandor | Litter And Waste Receptacle For Small Pet Animals |
| 3,793,989 | 02/26/74 | Clark | Deodorized Pet Relief Station |
| 3,831,557 | 08/27/74 | Elesh | Cat Litter Box |
| 3,990,397 | 11/09/76 | Lowe, Jr. | Sanitary Pet Box Structure |
| 4,271,544 | 06/09/81 | Hammond | Animal Commode |
| 4,279,217 | 07/21/81 | Behringer | Liner For A Litter Box |
| 4,541,360 | 09/17/85 | Higgins et al | Disposable Animal Litter Box |
| 4,548,160 | 10/22/85 | Feitelson | Cat Litter Box |
| 4,553,671 | 11/19/85 | Cheesman | Tear-open Compartmented Cat Litter Container |
| 4,627,382 | 12/09/86 | Muzzey | Disposable Litter Box |
| 4,640,225 | 02/03/87 | Yananton | Odorless Animal Litter Unit |
| 4,646,684 | 03/03/87 | Embry | Animal Waste Container |
| 4,696,257 | 09/29/87 | Neary et al | Self Drying Pet Litter Box |
| 4,766,845 | 08/30/88 | Bavas | Cat Litter Pan System |
| 4,771,731 | 09/20/88 | Derx et al | Litter Box |
| 4,813,376 | 03/21/89 | Kaufman et al | Cat Litter Tray |
| 4,838,202 | 06/13/89 | Neu | Animal Litter Container |
| 4,848,274 | 07/18/89 | Yananton | Odorless Animal Litter Unit |
| 4,852,518 | 08/01/89 | Yananton | Odorless Animal Litter Unit |
| 4,858,561 | 08/22/89 | Springer | Pet Litter Enclosure |
| 4,926,794 | 05/22/90 | Yamamoto | Domestic Pets' Chamberpot |
| 4,972,800 | 11/27/90 | Bennett et al | Pet Litter Box |
| 5,167,204 | 12/01/92 | Nussle | Litter Box |
| 5,195,464 | 03/23/93 | Mutter | Animal Litter Station |
| 5,211,133 | 05/18/93 | Foley | Litter Saver Device |
| 5,218,930 | 06/15/93 | Casmira | Litter Tray Apparatus |
| 5,220,885 | 06/22/93 | Goetz | Litter Box |
| 5,272,999 | 12/28/93 | Nussle | Litter Box |

SUMMARY OF THE INVENTION

All of the above desirable characteristics are provided by the litter box of the present invention. This improved litter box requires cats to enter by using their natural jumping abilities, entering through the top of the box, which has no side openings, and no doors or flaps to admit cats, except by entry from above. The walls of the litter box of the invention are sufficiently tall that a cat standing inside on the litter is surrounded by an unbroken wall, as high as the cat's shoulder when standing.

It will be appreciated by cat owners that cats are cautious creatures. Accordingly, no cat will jump into a box if it cannot first see into the box to determine the safety, and cleanliness of the interior of the litter box. It has been determined that if the cat can stand on its back legs with its forepaws on the top edge of the box, so that it can inspect the interior of the box before entry, that the cat will enter once it is satisfied that the box is acceptable to it. The necessity of jumping over the wall of the box is no impediment to cats. Even elderly cats of 20 plus years readily use the litter box of the invention.

Thus the present invention is directed to an improved litter box in which the exterior wall is approximately the height of the shoulder of the average cat when standing on its back legs, and the interior height above the normal bed of litter is greater than the height of a cat's shoulder when standing on all four legs. A shelf or ledge around the top of the walls is highly desirable for assisting the cat to enter and exit the box. Typical dimensions of a box meeting these criteria are: overall height of box 14.5 inches (36.8 cm), width 16 inches (40.6 cm), length 22 inches (55.9 cm) and the shelf around the top of the box 1.5 inches (3.8 cm), with an opening of 13 by 19 inches (33 cm by 48.3 cm) in the top of the box. The depth of the litter bed would typically be 3 inches (7.6 cm).

DETAILED DESCRIPTION OF THE PREFERRED EMBODIMENTS

Figure 1:
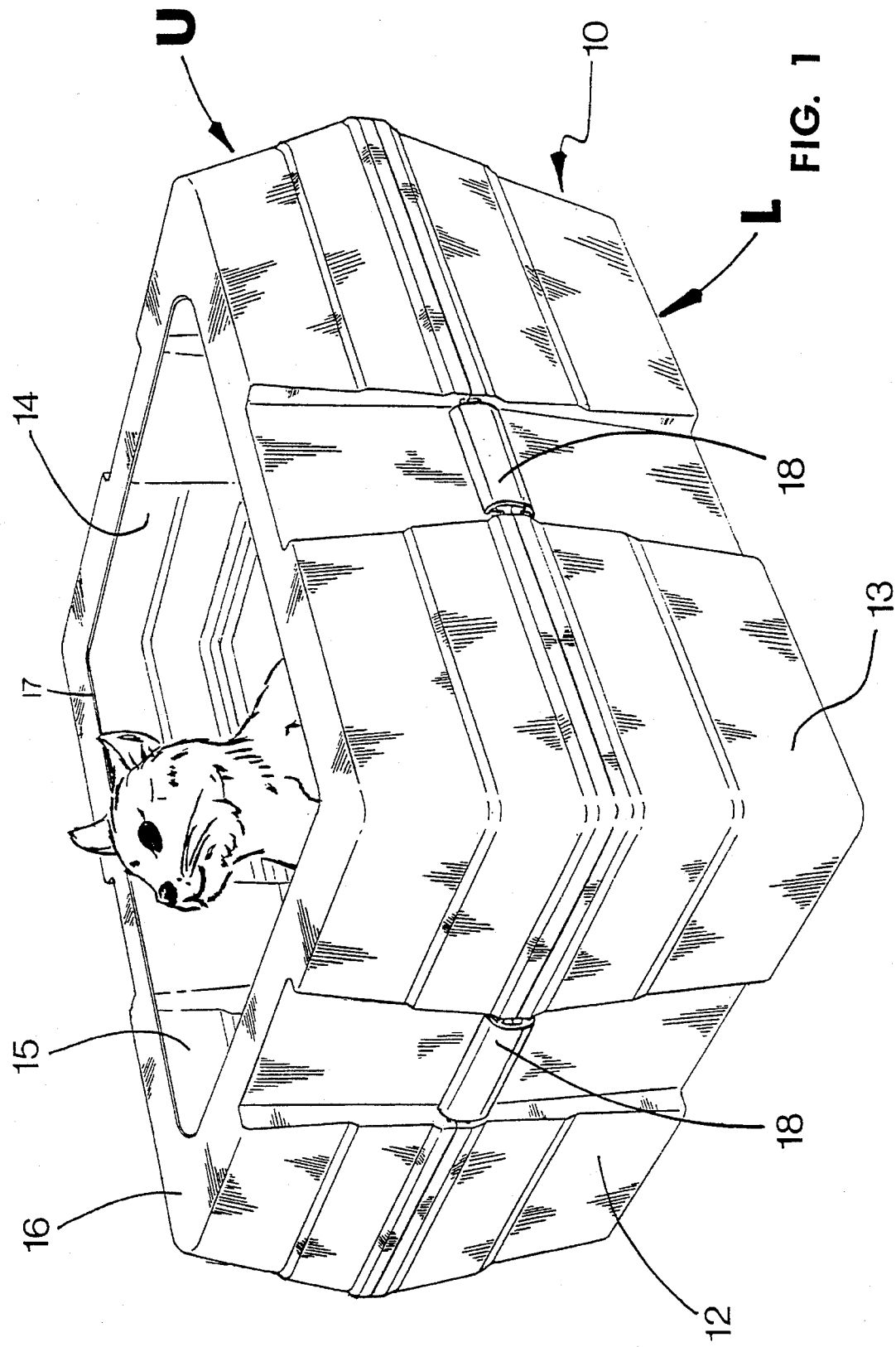
FIG. 1 is a perspective view of the improved cat litter box of the present invention.

The litter box of the present invention represents a simple yet elegant solution to the problems associated with conventional litter box designs. As shown in FIG. 1, the litter box 10 includes a solid bottom 11 (FIG. 2), upright sides 12, 13, 14 and 15 and a shelf 16 forming an opening 17 in the top of the box 10.

Preferably the box 10 is formed of upper and lower portions U and L which can, for example, be molded from a suitable translucent plastic polymer. The upper and lower portions are of identical size and shape, except for the opening 17 in the upper portion, and the solid bottom 11 of the lower portion. Thus it would be possible to mold both portions from the same mold by inserting a plate in the mold for forming the opening 17 when molding the upper portion U. The two halves of the litter box 10 are joined by a series of clips 18 which are formed of resilient material that damps the halves of the litter box together.

Figure 3:
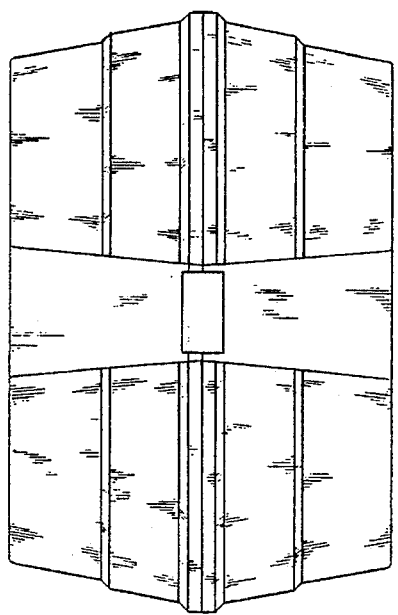
FIG. 3 is a side elevation of the litter box of FIG. 1.
Figure 4:
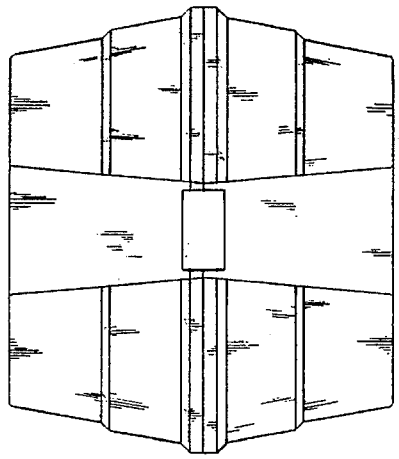
FIG. 4 is an end elevation of the litter box of FIG. 1.
Figure 2:
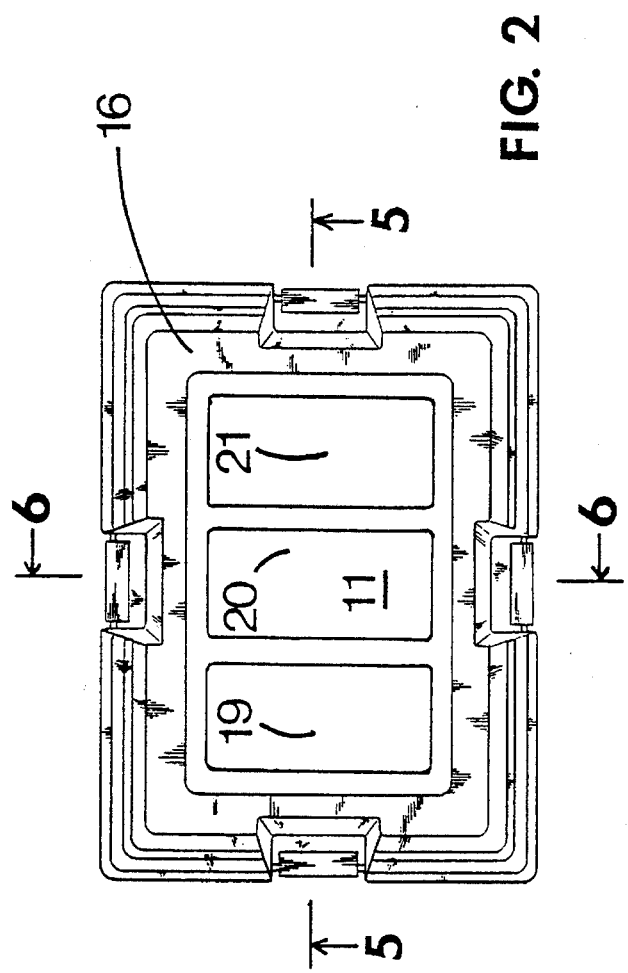
FIG. 2 is a top plan view of the litter box of FIG. 1.

From the top view of FIG. 2 the shelf or rim 16 can be clearly seen. Also raised panels 19, 20 and 21 are shown in this view, which serve to strengthen the bottom of the box 11, in a technique well known to those skilled in the plastic molding art. FIGS. 2, 3 and 4 are three views of the basically rectangular box 11, the specific shape being chosen for moldability and strength, while permitting the completed box to be molded in two halves from a single mold. Since the upper and lower sections are of identical, but inverted shape they may be nested for shipment by inverting the upper half into the lower half. Obviously several complete boxes can be nested together for shipping, and assembled at the point of sale.

Figure 6:
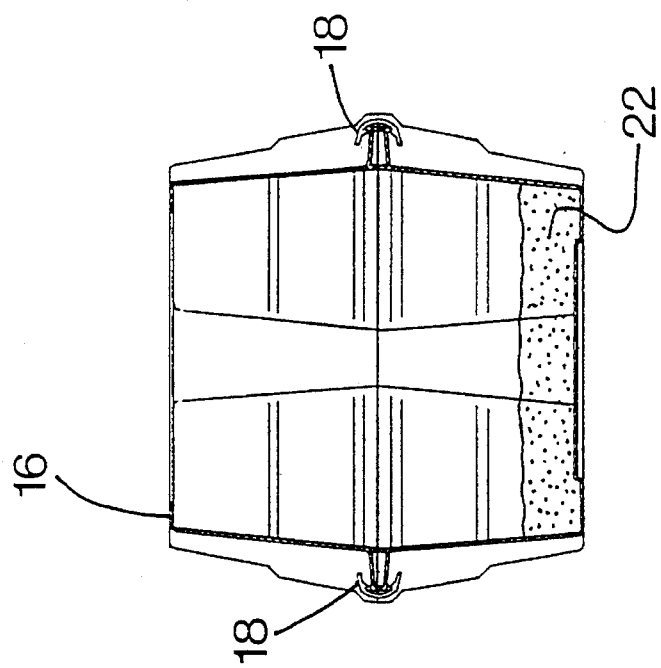
FIG. 6 is a transverse cross-section on the line 6—6 of FIG. 2.
Figure 5:
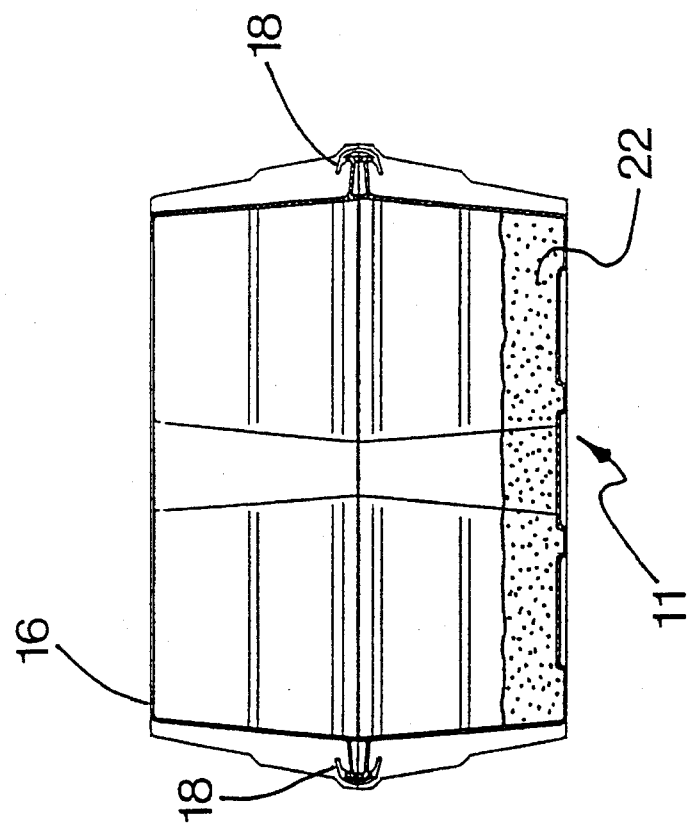
FIG. 5 is a longitudinal section of the litter box of FIG. 1 on the line 5—5 of FIG. 2.
Figures 7, 8:
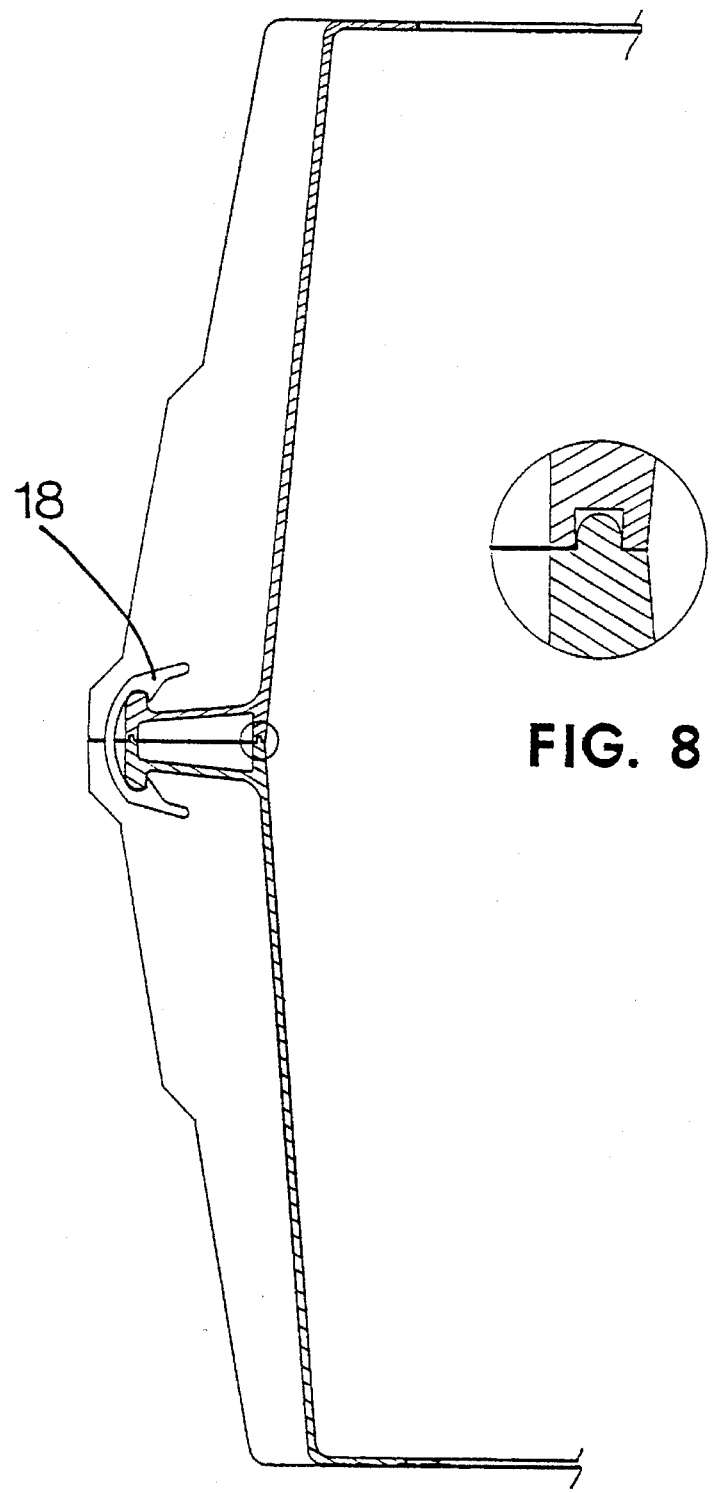
FIG. 7 is a partial section of the left hand side wall of FIG. 6.
FIG. 8 is an enlarged fragmentary view of the joint of FIG. 7.

The cross-sections of FIGS. 5 and 6 show the assembled components of the litter box 11 held together by clips 18. Litter 22 is shown in the box to a depth, for example, of 3 inches (7.6 cm).

As will be evident to those skilled in the art of plastic molding, the litter box of the invention may also be molded as a solid box having a top opening, and formed, for example, by blow molding from polyethylene. Such a manufacturing process could form the box without the opening 17 in the box as molded and the opening 17 would then be cut in the top of the box to complete the litter box.

A further advantage of the two part litter box is the possibility of removing the upper half so that the box may be used for an injured cat which could not enter the assembled box by jumping over the tall wall of the assembly. Similarly, the top may be removed for training a kitten to use the box. Kittens quickly learn to jump and the top could be reattached once the kitten had grown to a size to enter over the top of the assembled box. The owner of the box will also find it convenient to remove the upper portion from the lower portion when replacing the litter in the box. It is much easier to pour litter from the box once the upper portion has been removed.

A suitable litter is placed in the box typically to a depth of 3 inches (7.6 cm), when the litter box is put into use, as shown in FIGS. 5 and 6. Experience has shown that the best type of litter to use in a cat litter box is the dumping type of material, which has the property of the particles adhering to each other when moistened. Such litter is easy to maintain in clean condition by regular removal of clumped material, and can be obtained in either odorless or scented forms.

Figure 9:
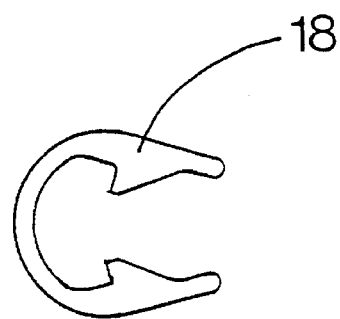
FIG. 9 is a section through the joining clip holding the upper and lower sections of the litter box together.

FIG. 9 shows the clip 18 as extruded, for example, from a suitable resilient plastic material. When applied to the upper and lower halves of the litter box, they are held securely together to prevent the escape of litter or urine from the joint between the halves. Obviously these clips would not be required for a one piece box.

Figure 10:
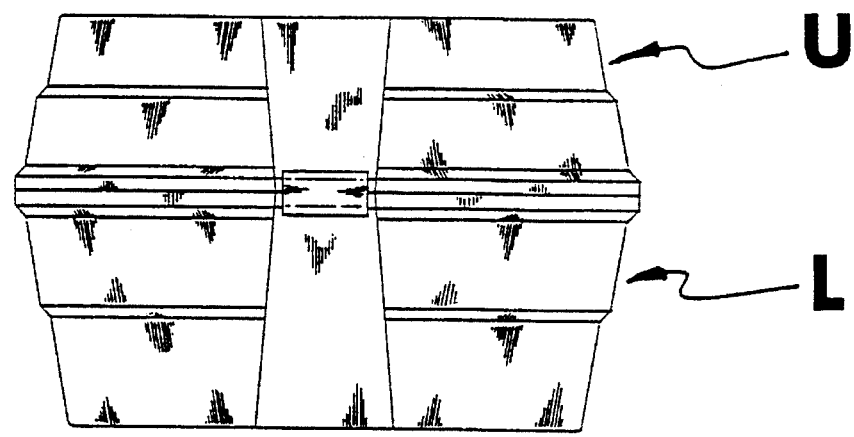
FIG. 10 is a side elevation of a second embodiment of the present invention in which the proportions of the upper and lower portions of the litter box are different than in FIG. 3.

FIG. 10 illustrates an alternative embodiment of the two piece litter box, which for aesthetic reasons has the lower portion L formed as taller than the upper portion U. The overall height of the box is the same as the first embodiment. The joint between the two portions is above the median height of the assembled box, for example, 8.25 inches (21 cm) above the base, and the upper portion is therefore 6.25 inches (15.8 cm), so the total height is still 14.5 inches (36.8 cm).

It is important, however, that the overall height of the box be such that a cat standing on its hind legs can just reach the shelf 16 with its forepaws, and see into the box before jumping inside. If the box is lower than this, then when litter is added there is a risk that the cat when standing inside may urinate over the shelf, or may be able to scatter litter over the shelf while burying its excreta in the litter. The design of this litter box is predicated on the facts that cats are inherent jumpers and climbers, cats are also naturally curious, and can't resist jumping into boxes, cats often have a need for privacy when eliminating, and finally a tall box provides a sense of security for the cat while in the box.

These considerations led to the design of a litter box with entry and exit achieved through an opening in the top of a tall four-sided box. All prior art litter boxes assume that the cat must enter the box by stepping over the side, just as a human would enter a room through a door. The litter box of the present invention has been designed around the way in which cats think, rather than imposing anthropomorphic limitations in the design. The top only entry of a tall box is entirely unknown in the prior art. All previous cat litter box designs in which the box was open at the top were of shallow proportions. None of the prior inventors recognized the benefits of a tall box which the cat jumps into, and from which no excreta and litter escapes. Incredibly, no-one prior to the present inventors has recognized the importance of the dimensions of a cat litter box as well as the necessity for top entry. If any litter should be stuck to the cat's paws after using the box, the act of jumping from the box contributes to removal of litter from the paws, leaving almost all of it in the litter box.

What is claimed is:

1. An improved cat litter box comprising:

a solid bottom wall molded with continuous side walls extending generally vertically upwardly from side edges of said bottom wall, a peripheral lip projecting generally horizontally inwardly from the top edge of said side walls to define an opening for providing access to an interior of the box defined by said side walls and said bottom wall, said side walls defining a width, a length, and a height of the box, said height of the box being more than one-half of the length of the box and being more than three-quarters of the width of the box, the height of the box being at least about 12 inches whereby an adult domestic cat can enter the interior of the box substantially only by jumping thereinto over said lip, and litter and excreta are retained in the box.

2. A litter box as in claim 1, formed from upper and lower molded portions, said lower portion comprising said bottom wall and a portion of a vertical extent of said side walls, the upper portion comprising the remainder of the vertical extent of said side walls and said lip.

3. A litter box as in claim 2, wherein each of said upper and lower portions define about half the height of the box.

4. A litter box as in claim 2, further comprising fastening means for securing said upper and lower portions together, said fastening means being selectively removable whereby the upper and lower portions may be fully disengaged.

5. A litter box as in claim 4, wherein said fastening means comprise a plurality of resilient plastic clips.

6. A litter box as in claim 2, wherein said upper and lower portions are formed so as to have complimentary shapes whereby said upper and lower portions may be nested together for shipping, with said upper section within said lower section.

7. A litter box as in claim 1, wherein the height of the box is at least about 14", wherein a width of said box is 16", wherein a length of said box is 22", and wherein the width of said lip is at least 1.5".

8. A litter box as in claim 1, wherein at least said side walls are formed from a translucent material whereby a cat can observe the interior of the box in advance of entry.

9. An improved cat litter box comprising:

a lower section molded as a unit having a solid bottom wall integral with continuous side walls extending generally vertically upwardly from side edges of said bottom wall, and an upper section removably fixed to said lower section and including side wall extensions and a peripheral lip projecting generally horizontally inwardly at least 1.5" from the top edges of said side wall extensions to define an opening for providing access to the interior of said box defined by said side walls, said side wall extensions, and said bottom wall, said side walls and said wall extensions, defining a width, a length, and a height of the box, said height of said box being more than one-half of the length of said box and being more than three-quarters of the width of said box, the height of said box being at least about three times a usual and customary depth of kitty litter disposed within the interior of said box whereby an adult domestic cat can enter the interior of said box substantially only by jumping thereinto over said lip, and litter and excreta are retained in said box.

10. A litter box as in claim 9, wherein each of said upper and lower sections defines about half the height of the box.

11. A litter box as in claim 9, further comprising a plurality of resilient plastic clips for securing said upper and lower sections together, said plastic clips being selectively removable whereby the upper and lower sections may be fully disengaged.

12. A litter box as in claim 9, wherein said upper and lower sections are formed so as to have complimentary shapes whereby said upper and lower sections may be nested together for shipping, with said upper section within said lower section.

13. A litter box as in claim 9, wherein the height of the box is at least about 14", wherein a width of said box is 16", and wherein a length of said box is 22".

14. A litter box as in claim 9, wherein at least said side walls are formed from a translucent material whereby a cat can observe the interior of the box in advance of entry.

* * * * *

UNITED STATES PATENT AND TRADEMARK OFFICE
CERTIFICATE OF CORRECTION

PATENT NO. : 5,590,623
DATED : January 7, 1997
INVENTOR(S) : TOOLE et al.

It is certified that error appears in the above-indentified patent and that said Letters Patent is hereby corrected as shown below:

On the title page, section 76, line 2, "both of P.O. Box 24111, Ontario," should be --both of P.O. Box 24111, Kanata, Ontario,--.

Column 1, line 49, "Parents" should be --Patents--.

Column 3, line 38, "damps" should be --clamps--.

Column 4, line 13, "dumping" should be --clumping--.

Signed and Sealed this

Fifteenth Day of July, 1997

Attest:

BRUCE LEHMAN

Attesting Officer

Commissioner of Patents and Trademarks